(12) United States Patent
Dittmar et al.

(10) Patent No.: US 10,054,165 B2
(45) Date of Patent: Aug. 21, 2018

(54) WHEEL BEARING UNIT AND METHOD OF SECURING THE WHEEL BEARING UNIT FOR TRANSPORT

(71) Applicants: Rico Dittmar, Schweinfurt (DE);
Achim Mueller, Dittelbrunn (DE);
Volker Wendt, Üchtelhausen/Zell (DE)

(72) Inventors: Rico Dittmar, Schweinfurt (DE);
Achim Mueller, Dittelbrunn (DE);
Volker Wendt, Üchtelhausen/Zell (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/996,374

(22) Filed: Jan. 15, 2016

(65) Prior Publication Data

US 2016/0214432 A1 Jul. 28, 2016

(30) Foreign Application Priority Data

Jan. 15, 2015 (DE) .......................... 10 2015 200 561

(51) Int. Cl.
| | |
|---|---|
| *F16C 41/04* | (2006.01) |
| *F16C 19/36* | (2006.01) |
| *B60B 27/00* | (2006.01) |
| *F16C 19/54* | (2006.01) |

(52) U.S. Cl.
CPC ............ *F16C 41/04* (2013.01); *B60B 27/001* (2013.01); *B60B 27/0078* (2013.01); *B60B 27/0094* (2013.01); *F16C 19/548* (2013.01); *F16C 19/364* (2013.01)

(58) Field of Classification Search
CPC .... F16C 41/04; F16C 2326/02; F16C 19/548; F16C 33/767; F16C 33/7826; F16C 33/80; F16C 19/364; B60B 27/001; B60B 27/0078; B60B 27/0094
See application file for complete search history.

(56) References Cited

U.S. PATENT DOCUMENTS

| | | | | |
|---|---|---|---|---|
| 1,930,312 A | * | 10/1933 | Greenhoe | ........... B60L 327/001 277/391 |
| 2,059,181 A | * | 10/1936 | Wilson | .................. F16C 19/364 384/571 |
| 3,245,735 A | * | 4/1966 | Hans Sikora | ....... F16C 33/7853 277/370 |
| 3,361,497 A | * | 1/1968 | Stengel | .................. F16C 33/66 277/412 |

(Continued)

FOREIGN PATENT DOCUMENTS

| | | |
|---|---|---|
| DE | 715355 C | 12/1941 |
| DE | 3809253 A1 | 8/1989 |

(Continued)

*Primary Examiner* — Alan B Waits
(74) *Attorney, Agent, or Firm* — Bryan Peckjian; SKF USA Inc. Patent Dept

(57) ABSTRACT

A wheel bearing unit includes a wheel hub, a first rolling-element bearing, and a fastener assembly, and the fastener assembly is formed separately from the wheel hub and is spaced from an axial end of the wheel hub. The fastener assembly secures at least one component of the rolling-element bearing against falling out of the wheel hub away from a center of mass of the wheel bearing unit, and the fastener assembly contacts the wheel hub.

20 Claims, 1 Drawing Sheet

(56) References Cited

U.S. PATENT DOCUMENTS

| | | | | |
|---|---|---|---|---|
| 4,408,808 A * | 10/1983 | Redmann, Jr. | ........ | F16C 13/006 384/473 |
| 4,687,349 A * | 8/1987 | Pachuta | .................. | F16C 33/78 277/375 |
| 5,090,778 A * | 2/1992 | Laudszun | ............. | B60B 27/001 301/105.1 |
| 5,242,229 A * | 9/1993 | McLarty | ............. | F16C 33/7826 384/477 |
| 5,757,084 A * | 5/1998 | Wagner | ................. | B60B 27/001 29/894.361 |
| 5,875,550 A * | 3/1999 | Kohn | .................. | B25B 27/0028 29/898.07 |
| 6,149,244 A * | 11/2000 | Wagner | ................. | B60B 27/001 29/898.07 |
| 6,457,869 B1 * | 10/2002 | Smith | ................... | B60B 27/001 384/448 |
| 7,267,486 B2 * | 9/2007 | Ohtsuki | .................. | B60T 8/329 384/448 |
| 7,305,765 B2 * | 12/2007 | Mitsue | ...................... | B23B 5/02 29/894.362 |
| 7,506,940 B2 * | 3/2009 | White | ................... | B60B 27/001 301/105.1 |
| 7,675,212 B2 * | 3/2010 | Kobayashi | ............. | F16J 15/326 277/317 |
| 8,033,735 B2 * | 10/2011 | Furukawa | ........... | B60L 327/001 384/477 |
| 8,356,939 B2 * | 1/2013 | Seo | ...................... | F16C 19/184 324/207.25 |
| 8,356,941 B2 * | 1/2013 | Mason | ................. | F16C 33/7813 384/477 |
| 8,511,902 B2 * | 8/2013 | Heim | .................... | B60B 27/001 384/448 |
| 8,596,872 B2 * | 12/2013 | Pruden | ................. | F16C 33/7879 277/351 |
| 8,696,211 B2 * | 4/2014 | Haepp | ................. | F16C 33/7883 277/351 |
| 8,956,054 B2 * | 2/2015 | Niebling | ................ | F16C 33/585 384/544 |
| 9,061,545 B2 * | 6/2015 | Horn | ................... | B60B 27/001 |
| 2003/0094849 A1 * | 5/2003 | Joki | ....................... | B60B 27/001 301/105.1 |
| 2010/0150487 A1 * | 6/2010 | Beck | ...................... | F16C 19/548 384/494 |
| 2010/0150488 A1 * | 6/2010 | Beck | ....................... | F16C 19/54 384/537 |
| 2015/0071581 A1 * | 3/2015 | Gieser | ................. | F16C 33/7886 384/559 |
| 2016/0039434 A1 * | 2/2016 | Van Der Ham | ........ | B61F 15/20 301/108.1 |
| 2016/0356311 A1 * | 12/2016 | Villela | .................... | F16C 35/061 |
| 2017/0087934 A1 * | 3/2017 | Duch | ................. | B60L 327/0005 |

FOREIGN PATENT DOCUMENTS

| | | |
|---|---|---|
| DE | 3922858 A1 | 1/1991 |
| DE | 4029176 A1 | 3/1992 |
| DE | 10326617 A1 | 3/2005 |
| EP | 0776775 A1 | 6/1997 |

\* cited by examiner

WHEEL BEARING UNIT AND METHOD OF SECURING THE WHEEL BEARING UNIT FOR TRANSPORT

CROSS-REFERENCE

This application claims priority to German patent application no. 10 2015 200 561.5 filed on Jan. 15, 2015, the contents of which are fully incorporated herein by reference.

TECHNOLOGICAL FIELD

The invention is directed to a wheel bearing unit that includes a fastener assembly for securing at least one component of the rolling-element bearing against falling out of a wheel hub.

BACKGROUND

A wheel bearing unit is known that includes a wheel hub, two rolling-element bearings disposed at axial ends of the wheel hub, and an attachment unit. The attachment unit of this known wheel bearing unit is configured as a separate element from the wheel hub and is mounted at a location spaced from one axial end of the wheel hub. The attachment unit secures the two rolling-element bearings against falling out of the wheel hub and/or against falling away from a center of mass of the wheel bearing unit. The known attachment unit is a clamp ring that is disposed in the bores of the rolling-element bearings during transport of the wheel bearing unit. Grooves are provided in the inner rings of each bearing to engage the clamp ring, and the clamp ring secures the rolling element bearings against falling out.

It is also known to attach two rolling-element bearings of a wheel bearing unit to the wheel hub using cable ties that extend through the bores around the wheel hub of the wheel bearing unit.

SUMMARY

One aspect of the disclosure is to provide an efficient arrangement for securing the rolling-element bearings of a wheel bearing unit of the above-described type during transport.

Another aspect of the disclosure comprises a wheel bearing unit having a wheel hub, at least one first rolling-element bearing and at least one fastener assembly. The fastener assembly is separate from the wheel hub and is disposed at a location spaced from an axial end of the wheel hub. The fastener assembly secures at least one component of the rolling-element bearing against falling out of the wheel hub and/or against falling away from a center of mass of the wheel bearing unit.

The fastener assembly is configured to contact the wheel hub. As used herein, an "fastener assembly" should be understood to be a unit or elements that is/are intended for securing a part of a rolling-element bearing and that, preferably, does not itself comprise any rolling-element bearing components. According to the disclosure a wheel bearing unit can be provided with an efficient arrangement for securing components of the wheel bearing unit during transport, and this arrangement is generally more cost-effective than using conventional clamping rings. Beneficially, the disclosed arrangement eliminates the need to provide grooves in the inner surfaces of the rolling element bearings for affixing conventional clamp rings. It also avoids the issue of the expensive handling and disposal of cable ties.

The fastener assembly is preferably at least partially made from metal.

Advantageously the fastener assembly attaches the rolling-element bearing to the wheel hub with respect to the axial direction of the wheel bearing unit.

Furthermore the fastener assembly may be disposed completely inside the wheel hub.

The fastener assembly may comprise and/or be referred to as a "transport-securing unit."

Moreover, the transport securing fastener assembly may be left in place during an operating state of the wheel bearing in which state the fastener assembly will continue to secure bearing components against falling out of the wheel hub and/or falling away from the center of mass of the wheel bearing unit.

Preferably the entire fastener assembly is disposed on one axial end region of the rolling-element bearing.

Preferably the fastener assembly engages in a groove of the wheel hub. Advantageously the fastener assembly may include a disc and an angle ring. The disc engages in the groove of the wheel hub and holds the angle ring in abutment with an axial end surface of the component. The disc holds the angle ring in an interference-fit manner with respect to an axial direction of the wheel bearing unit. Producing the necessary groove in the wheel hub is cost-effective because it can be formed during or shortly before or after related, necessary wheel hub processing steps occur.

In another aspect of the disclosure, the fastener assembly comprises a ring including an annular portion, at least one axial projection extending from a radially outer portion of the annular portion and a radial flange extending from the at least one axial projection. The fastener assembly also includes a disk having an inner circumference configured to prevent the ring from passing axially through the disk.

In a further aspect of the disclosure, the fastener assembly comprises a ring including an annular portion, an axial skirt extending from a radially outer portion of the annular portion and a radial flange extending from the axial skirt. The flange has an outer diameter. The fastener assembly also includes a disk having an inner diameter smaller than the outer diameter, the disk outer diameter being mounted in a circumferential groove in the wheel hub, and the disk inner diameter extending around the axial skirt and being located axially adjacent the flange.

Another aspect of the disclosure comprises a wheel bearing unit that includes a first rolling-element bearing having an inner ring and an outer ring, a wheel hub having a circumferential groove axially adjacent the first rolling element bearing outer ring, an angle ring having a first portion overlying an axially outer surface of the inner ring, a second portion overlying a radially outer surface of the bearing inner ring and a flange projecting radially outwardly from the second portion. The unit also includes a disk having an outer periphery located in the circumferential groove and an inner peripheral portion axially abutting the flange for holding the angle ring against the bearing inner ring.

In another aspect of the disclosure, the fastener assembly comprises a ring including an annular portion, at least one axial projection extending from a radially outer portion of the annular portion and a radial flange extending from the at least one axial projection. The fastener assembly also includes a disk having an inner circumference configured to prevent the ring from passing axially through the disk.

In yet another aspect of the disclosure, the fastener assembly comprises a ring including an annular portion, an axial skirt extending from a radially outer portion of the annular portion and a radial flange extending from the axial skirt. The flange has an outer diameter. The fastener assembly also includes a disk having an inner diameter less than the outer diameter, the disk outer diameter being mounted in a circumferential groove in the wheel hub and the disk inner diameter extending around the axial skirt and being located axially adjacent the flange.

Furthermore, a method for securing wheel hub components for transport is disclosed. In this method, a fastener assembly as described above, is used to secure at least one component of a rolling-element bearing against falling out of the wheel hub away and/or against falling away from a center of mass of the wheel hub. The fastener assembly contacts the wheel hub.

Further advantages arise from the following description of the drawings. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
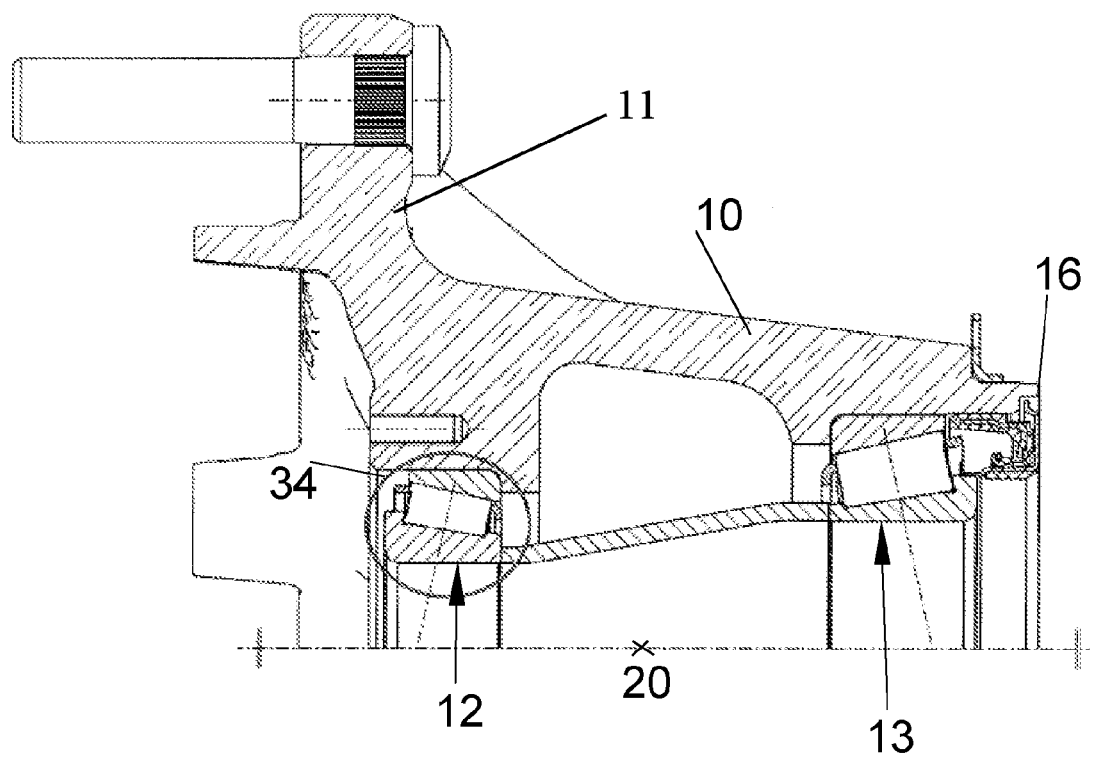
FIG. 1 is a partial section through a portion of a conventional wheel bearing unit.

FIG. 1 is a partial section through a conventional wheel bearing unit. The wheel bearing unit includes a wheel hub 10, a first rolling-element bearing 12, and a second rolling-element bearing 13. The wheel hub includes a flange 11 at a first axial end and has a second axial end 16 spaced from the flange 11. The first rolling-element bearing 12 is located near the first axial end and the second rolling-element bearing 13 is located near the second axial end 16. The first rolling-element bearing 12 may be described as being spaced from the second axial end 16 of the wheel hub and as being opposite the second axial end 16. The wheel bearing unit also has a center of mass 20.

Figure 2:
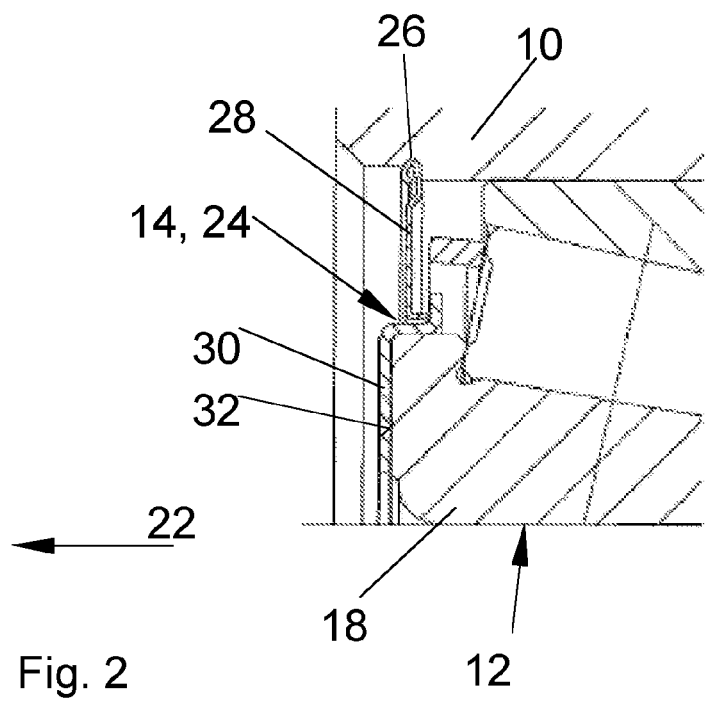
FIG. 2 is a partial section through an axial end region of an wheel bearing unit according to the present disclosure.

The wheel bearing unit according to the present disclosure includes some elements of the conventional wheel bearing unit of FIG. 1, and identical elements are identified with like reference numerals in the drawing figures. Differences between the disclosed wheel bearing unit and the conventional wheel bearing unit are shown in FIG. 2 and are described below. Most of the differences between the conventional wheel bearing unit and the wheel bearing unit of the present disclosure can be found in or near the region of circle 34 in FIG. 1, and this portion of the wheel bearing unit of the present disclosure is illustrated in FIG. 2.

The disclosed wheel bearing unit includes a wheel hub 10, a first rolling-element bearing 12, and a second rolling-element bearing (not depicted in FIG. 2). The first rolling-element bearing 12 is disposed near a first axial end of the wheel hub and is spaced from the second axial end 16 of the wheel hub and is opposite the second axial end 16. Furthermore, the wheel bearing unit includes a fastener assembly 14 that is formed separately from the wheel hub and that is installed at a location spaced from the second axial end 16 of the wheel hub (that is, generally near the first axial end of the wheel hub).

The fastener assembly 14 is configured to secure the first rolling-element bearing 12 against falling out of the wheel hub and/or against falling away from a center of mass 20 of the wheel bearing unit. For this purpose the fastener assembly 14 includes a disc 28 that is configured to engage or be mounted in a groove 26 of the wheel hub such that the disc attaches to the wheel hub in an interference-fit manner with respect to an axial direction 22 of the wheel bearing unit. The disc 28 contacts a base of the groove 26. In addition, the fastener assembly 14 includes an angle ring 30 that abuts on an axial end surface 32 of a component 18 of the rolling-element bearing 12. In this case, the component 18 is the inner ring of the first rolling-element bearing 12. The angle ring 30 engages the disc 28 from behind (e.g., from the side facing into the first rolling-element bearing 12) and is thereby attached to the wheel hub in an interference-fit manner with respect to the axial direction 22. Due to the abutment of the angle ring 30 on the end surface the rolling-element bearing 12, the angle ring 30 is attached to the wheel hub by the fastener assembly 14 in an interference-fit manner with respect to the axial direction 22.

The fastener assembly 14 is comprised of the angle ring 30 and the disc 28. Thus the entire fastener assembly 14 is disposed on an axial end region 24 of the rolling-element bearing 12 and inside the wheel hub. The angle ring 30 and the disc 28 are both made from metal.

The fastener assembly 14 installed in the manner described above secures elements of the wheel hub assembly (e.g., the first rolling element bearing 12) during transport and thus may be described as a transport-securing configuration or method. Furthermore, the fastener assembly 14 may be left in place during operation of the wheel hub assembly because it is located in a region that will not interfere with proper operation and use of the wheel hub assembly. It is therefore possible, but not necessary, to remove the fastener assembly 14 when the wheel hub assembly arrives at its destination and is assembled into an apparatus for use.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved wheel bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Wheel hub
11 Flange
12 Rolling-element bearing
13 Rolling-element bearing
14 Fastener assembly
16 Second axial end
18 Component
20 Center of mass
22 Axial direction
24 End region
26 Groove
28 Disc
30 Angle ring
32 End surface
34 Region

What is claimed is:

1. A wheel bearing unit comprising:
a first rolling-element bearing having an inner ring and an outer ring,
a wheel hub having a circumferential groove axially adjacent the first rolling element bearing outer ring,
an angle ring having a first portion overlying an axially outer surface of the inner ring, a second portion overlying a radially outer surface of the bearing inner ring and a flange projecting radially outwardly from the second portion, and
a disk having an outer periphery located in the circumferential groove and an inner peripheral portion axially abutting the flange and holding the angle ring against the bearing inner ring.

2. The wheel bearing unit according to claim 1, wherein the first rolling-element bearing comprises a non-spherical rolling element bearing.

3. The wheel bearing unit according to claim 1, wherein the first portion of the angle ring is in direct contact with the axially outer surface of the inner ring and the second portion of the angle ring is in direct contact with the radially outer surface of the bearing inner ring.

4. The wheel bearing unit according to claim 1, wherein the disk is integrally formed and includes an outer peripheral edge in the circumferential groove and an inner peripheral edge abutting the flange.

5. The wheel bearing unit according to claim 1, wherein the flange is located axially inward of an axial end of the inner ring and axially outward of an axial end of the outer ring.

6. The wheel bearing unit according to claim 1, wherein the angle ring and disk are disposed entirely inside the wheel hub.

7. A wheel bearing unit comprising:
a wheel hub,
a first tapered rolling-element bearing, and
a fastener assembly, the fastener assembly being separate from the wheel hub and being spaced from an axial end of the wheel hub,
wherein the fastener assembly secures an inner bearing ring of the tapered rolling-element bearing against falling out of the wheel hub away from a center of mass of the wheel bearing unit,
wherein the fastener assembly comprises a ring and a disk, the ring comprising an annular disk axially abutting the inner bearing ring and at least one axial projection radially abutting the inner bearing ring and a radial flange extending from the at least one axial projection and wherein the disk is connected to the wheel hub and configured to prevent the ring from moving away from the center of mass of the wheel bearing unit by pressing axially against the radial flange, and
wherein the fastener assembly is disposed entirely inside the wheel hub.

8. The wheel bearing unit according to claim 7, wherein the fastener assembly is at least partially made from metal.

9. The wheel bearing unit according to claim 7, wherein the fastener assembly attaches the rolling-element bearing to the wheel hub with respect to an axial direction of the wheel bearing unit.

10. The wheel bearing unit according to claim 7, wherein the fastener assembly is a transport-securing unit.

11. The wheel bearing unit according to claim 7, wherein the fastener assembly is mounted in a manner that does not interfere with an operating state of the wheel bearing unit.

12. The wheel bearing unit according to claim 7, wherein an outer periphery of the disk engages in a groove of the wheel hub.

13. The wheel bearing unit according to claim 12, wherein the ring comprises an angle ring in abutment on an axial end surface of the inner bearing ring in an interference-fit manner with respect to an axial direction of the wheel-bearing unit.

14. The wheel bearing unit according to claim 7,
wherein the fastener assembly is at least partially made from metal,
wherein the fastener assembly attaches the rolling-element bearing to the wheel hub with respect to an axial direction of the wheel bearing unit,
wherein the fastener assembly is a transport-securing unit, and
wherein the fastener assembly is mounted in a manner that does not interfere with an operating state of the wheel bearing unit.

15. The wheel bearing unit according to claim 7,
wherein the radial flange has an outer diameter and the disk has an inner diameter less than said outer diameter.

16. The wheel bearing unit according to claim 7,
wherein the disk has an inner diameter less than an outer diameter of the flange, the disk is mounted in a circumferential groove in the wheel hub and the disk inner diameter extends around the at least one axial projection and is located axially adjacent the flange.

17. The wheel bearing unit according to claim 1, wherein the radial flange is located axially inward of an axial end of the inner bearing ring and axially outward of an axial end of the bearing outer ring.

18. A method of securing an inner bearing ring of a wheel hub assembly against falling out of the wheel hub assembly comprising:
placing an angle ring against the inner bearing ring such that a first portion of the angle ring axially abuts an axially outer surface of the inner bearing ring and a second portion of the angle ring radially abuts a radially outer surface of the inner bearing ring, the angle ring including a flange, and
snapping a disk into a circumferential groove in the wheel hub such that a radially inner portion of the disk axially abuts the flange.

19. The method according to claim 18, wherein the inner bearing ring is an inner bearing ring of a non-spherical rolling-element bearing.

20. The method according to claim 18, wherein the disk is integrally formed and includes an outer peripheral edge in the circumferential groove and an inner peripheral edge abutting the flange.

\* \* \* \* \*